(12) United States Patent
Ezenekwe et al.

(10) Patent No.: US 12,735,194 B2
(45) Date of Patent: Sep. 15, 2026

(54) SMART IOT CONTROLLER FOR GATHERING AND TRANSMITTING AIRCRAFT HEALTH INFORMATION DURING FLIGHT

(71) Applicant: Hamilton Sundstrand Corporation, Charlotte, NC (US)

(72) Inventors: Dan Ezenekwe, Calumet City, IL (US); Thomas Wiegele, Saint Paul, MN (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 274 days.

(21) Appl. No.: 18/430,142

(22) Filed: Feb. 1, 2024

(65) Prior Publication Data

US 2025/0250025 A1 Aug. 7, 2025

(51) Int. Cl.
*B64D 45/00* (2006.01)
*B64F 5/60* (2017.01)

(52) U.S. Cl.
CPC ................ *B64D 45/00* (2013.01); *B64F 5/60* (2017.01); *B64D 2045/0085* (2013.01)

(58) Field of Classification Search
CPC ... B64D 45/00; B64D 2045/0085; B64F 5/60; H04B 7/18506; H04L 67/125; H04L 67/12
See application file for complete search history.

(56) References Cited

U.S. PATENT DOCUMENTS 7,478,782 B2 1/2009 Huang et al.
11,239,570 B2 2/2022 Fried et al.
11,254,441 B2 * 2/2022 Hayes ................ G05B 19/0421
11,412,374 B2 8/2022 Avila et al.
11,597,295 B1 * 3/2023 Lohe ....................... B60L 58/12
2007/0139169 A1 * 6/2007 Mitchell ............ H04B 7/18506 340/425.5
2008/0177436 A1 7/2008 Fortson
2009/0243895 A1 * 10/2009 Mitchell ................ H01Q 1/007 340/971
2013/0197725 A1 8/2013 Odell et al.
2015/0363981 A1 12/2015 Ziarno et al.
2016/0260265 A1 * 9/2016 Buehler ................. B64D 45/00
2017/0147008 A1 * 5/2017 Mere ........................ G08G 5/34
2017/0200328 A1 * 7/2017 Jensen ................... G07C 5/008
2017/0277995 A1 * 9/2017 Giering .................... G01H 1/00
2017/0334574 A1 * 11/2017 Wilson ................ H04J 14/0227
2017/0334575 A1 * 11/2017 Wilson ............... G01K 11/3206
2018/0288080 A1 * 10/2018 Keller ................. H04L 63/1425
2019/0090800 A1 * 3/2019 Bosworth ............ A61B 5/0015
2019/0128191 A1 * 5/2019 Moravek ................ H02K 11/35
2019/0180527 A1 * 6/2019 Segal ..................... G06N 20/00
(Continued)

*Primary Examiner* — Mussa A Shaawat
(74) *Attorney, Agent, or Firm* — CANTOR COLBURN LLP

(57) ABSTRACT

Embodiments of the disclosure provide an aircraft health monitoring system having an in-flight controller. The controller is configured to, responsive to a determination that an aircraft is in-flight, access a sensor network system of the aircraft to generate in-flight system health (IFSH) information. A transmission operation is initiated that transmits the IFSH information through a wireless communications path to a ground-based flight monitoring system. The ground-based flight monitoring system is operable to initiate an aircraft management operation associated with the aircraft.

20 Claims, 9 Drawing Sheets

(56) References Cited

U.S. PATENT DOCUMENTS

2020/0165995 A1* 5/2020 Moeckly .................. G07C 5/02
2020/0172261 A1* 6/2020 Hayes .................... B64D 45/00
2020/0180790 A1* 6/2020 Ramaswamy ........... G08G 5/21
2021/0389968 A1 12/2021 Majewski et al.
2021/0399203 A1* 12/2021 Farhangdoust ....... H02J 50/001
2021/0399658 A1* 12/2021 Farhangdoust .... G01N 29/2437
2022/0312181 A1* 9/2022 Sumien ................. H04W 76/12
2023/0002072 A1* 1/2023 Olson .................. H04B 7/1851
2023/0406535 A1* 12/2023 Esterle .................. F01D 21/003
2024/0051410 A1* 2/2024 Wiegman ............ H02J 7/00032
2024/0153390 A1* 5/2024 Matsumura ............. B64C 13/20

* cited by examiner

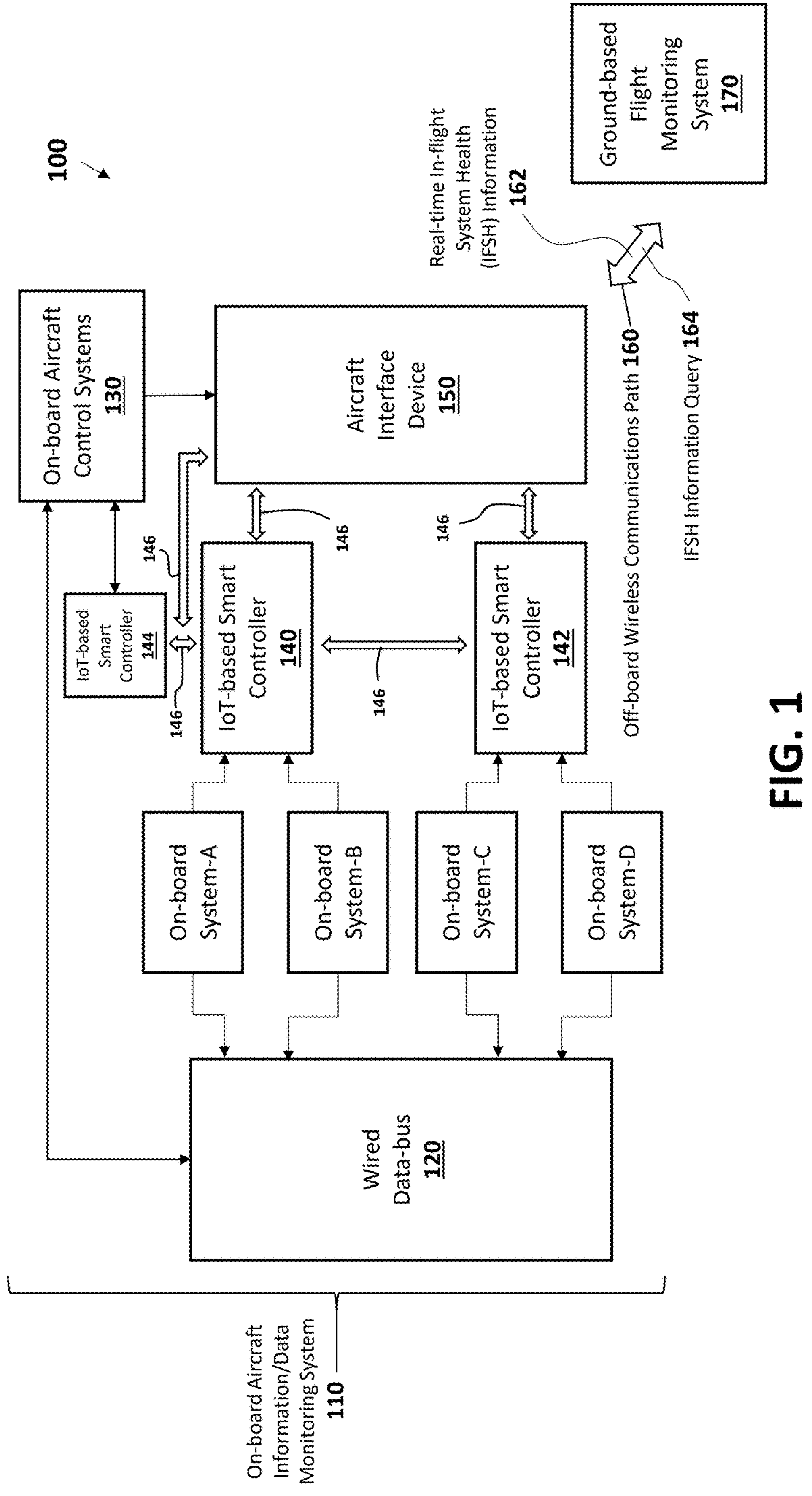
100
On-board Aircraft Control Systems 130
Aircraft Interface Device 150
Real-time In-flight System Health (IFSH) Information 162
Ground-based Flight Monitoring System 170
Off-board Wireless Communications Path 160
IFSH Information Query 164
IoT-based Smart Controller 144
IoT-based Smart Controller 140
IoT-based Smart Controller 142
146
On-board System-A
On-board System-B
On-board System-C
On-board System-D
Wired Data-bus 120
On-board Aircraft Information/Data Monitoring System 110
FIG. 1

SMART IOT CONTROLLER FOR GATHERING AND TRANSMITTING AIRCRAFT HEALTH INFORMATION DURING FLIGHT

BACKGROUND

The present disclosure relates in general to electronic control and communications systems used in air flight. More specifically, the present disclosure relates to a smart controller for gathering and transmitting aircraft system health information during flight.

The term "avionics" has been used to describe various types of electronic control and communications systems used in connection with executing air flight. The cockpit of an aircraft is a typical location for avionic equipment, including control, monitoring, communication, navigation, weather, and anti-collision systems. Sensors and transducers in aircraft systems relay continuous information, such as fuel pressure and oil temperature, to the flight crew through instruments and gauges or to an onboard computer. Sensors are used to ensure the safe operation of the aircraft as they provide information needed (e.g., by a pilot) to make decisions or a systems computer to maintain the proper pressure or temperature.

Aircraft also include aircraft health monitoring systems, which are generally a collection of sensing and electronic computing tools that monitor aircraft data in order to understand the present or future serviceability and performance of aircraft components/parts.

BRIEF DESCRIPTION

Disclosed is an aircraft health monitoring system having an in-flight controller configured to, responsive to a determination that an aircraft is in-flight, access a sensor network system of the aircraft to generate in-flight system health (IFSH) information. A transmission operation is initiated that transmits the IFSH information through a wireless communications path to a ground-based flight monitoring system. The ground-based flight monitoring system is operable to initiate an aircraft management operation associated with the aircraft.

In addition to any one or more of the features described herein, the controller is further configured to receive through the wireless communications path an IFSH change request.

In addition to any one or more of the features described herein, the controller is further configured to, responsive to the IFSH change request, change an aspect of the IFSH information that is transmitted through the wireless communications path to the ground-based flight monitoring system.

In addition to any one or more of the features described herein, the change to the aspect of the IFSH information includes an additional set of IFSH information with the IFSH information.

In addition to any one or more of the features described herein, the change to the aspect of the IFSH information includes changing an information sampling rate associated with generating the IFSH information.

In addition to any one or more of the features described herein, the IFSH information includes pre-processed IFSH information.

In addition to any one or more of the features described herein, the controller is further configured to apply preprocessing operations to at least a portion of the IFSH information to generate the pre-processed IFSH information.

In addition to any one or more of the features described herein, the pre-processing operations are selected from a group consisting of: condensing the portion of the IFSH information; and filtering the portion of the IFSH information.

In addition to any one or more of the features described herein, the aircraft management operation includes using IFSH information in a predictive analysis operation.

In addition to any one or more of the features described herein, a result of the predictive analysis operation is provided to a flight management system associated with the aircraft.

Further disclosed is a method of making an in-flight controller of an aircraft health management system. The method includes configuring the in-flight controller to, responsive to a determination that an aircraft is in-flight, access a sensor network system of the aircraft to generate in-flight system health (IFSH) information. The controller is further configured to initiate a transmission operation that transmits the IFSH information through a wireless communications path to a ground-based flight monitoring system. The ground-based flight monitoring system is operable to initiate an aircraft management operation associated with the aircraft.

In addition to any one or more of the features described herein, the controller is further configured to receive through the wireless communications path an IFSH change request.

In addition to any one or more of the features described herein, the controller is further configured to, responsive to the IFSH change request, change an aspect of the IFSH information that is transmitted through the wireless communications path to the ground-based flight monitoring system.

In addition to any one or more of the features described herein, the change to the aspect of the IFSH information includes including an additional set of IFSH information with the IFSH information.

In addition to any one or more of the features described herein, the change do the aspect of the IFSH information includes changing an information sampling rate associated with generating the IFSH information.

In addition to any one or more of the features described herein, the IFSH information includes pre-processed IFSH information.

In addition to any one or more of the features described herein, the controller is further configured to apply preprocessing operations to at least a portion of the IFSH information to generate the pre-processed IFSH information.

In addition to any one or more of the features described herein, the pre-processing operations are selected from a group consisting of: condensing the portion of the IFSH information; and filtering the portion of the IFSH information.

In addition to any one or more of the features described herein, the aircraft management operation includes using IFSH information in a predictive analysis operation.

In addition to any one or more of the features described herein, a result of the predictive analysis operation is provided to a flight management system associated with the aircraft.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 1 is a simplified block diagram illustrating a system in accordance with embodiments of the disclosure;

Figure 2:
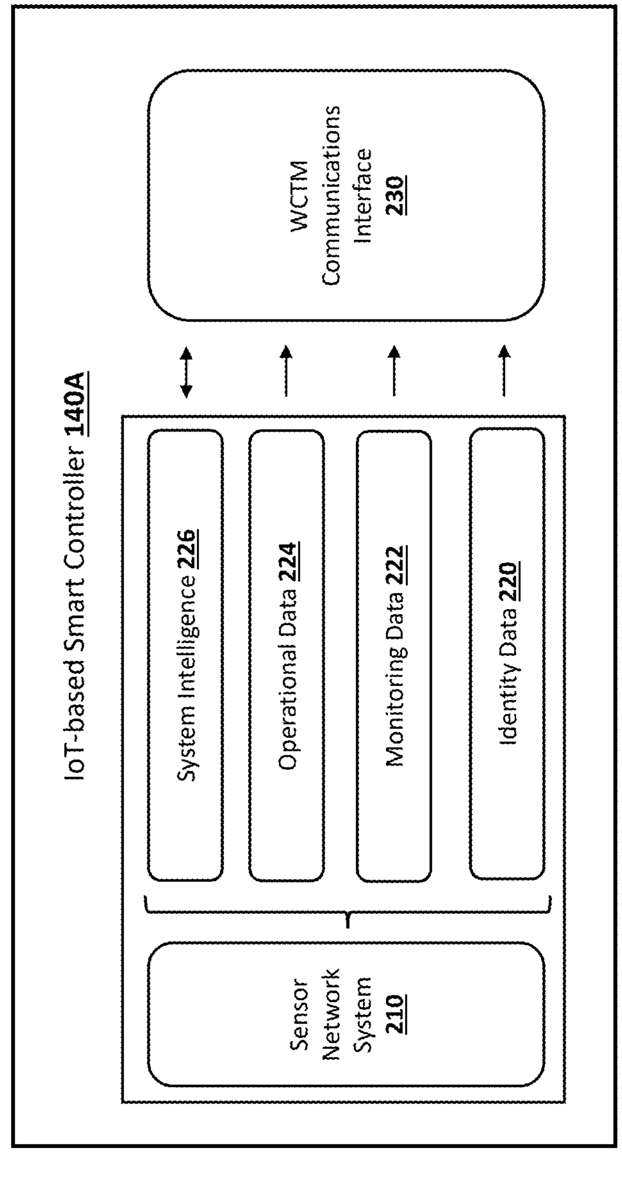
FIG. 2 is a simplified block diagram illustrating a smart controller in accordance with embodiments of the disclosure.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

A detailed description of one or more embodiments of the disclosed apparatus and method are presented herein by way of exemplification and not limitation with reference to the Figures.

As previously noted herein, aircraft can include aircraft health monitoring systems, which are generally a collection of sensing and electronic computing tools that monitor aircraft data in order to understand the present or future serviceability and performance issues of aircraft components/parts. Because conventional aircraft components/parts communicate with one another and/or other aircraft systems primarily over a wired aircraft data-bus, aircraft data gathered by a conventional on-board aircraft health monitory system can only be accessed and analyzed by off-board data analysis systems when the aircraft is on the ground and not airborne.

Exemplary embodiments of the disclosure address the above-described shortcomings of known wired aircraft health monitoring systems by providing a novel wireless aircraft health monitoring (AHM) system having novel IoT-based smart controllers operable to provide wireless communication capabilities between and among aircraft components/parts and other on-board aircraft systems. In some embodiments of the disclosure, the IoT-based smart controllers are IoT-enabled smart electronic power system (EPS) controllers operable to control electronic power generation and distribution components/part of an aircraft. In some embodiments of the disclosure, the IoT-based smart controller(s) are integrated in the aircraft component/part during fabrication of the aircraft component/part. In some embodiments of the disclosure, the IoT-based smart controller(s) are coupled to the aircraft component/part after fabrication of the aircraft component/part, thereby providing or adding communications functionality to aircraft components/parts that were not originally fabricated with wireless communication functionality. In embodiments of the disclosure, the wireless communications functionality added by the novel IoT-based smart controllers provides communications redundancy with the existing wired data-bus communications path and has the technical benefit of the wireless communication path having different failure points than the wired communications path, as well as providing additional safety redundancy to the wired communications path.

In embodiments of the disclosure, the novel IoT-based smart controllers enable the novel wireless AHM system to accumulate and transmit substantially real-time aircraft system health information/data to off-board data analysis systems during flight so that aircraft health data can be accessed and analyzed by off board systems (e.g., ground-based systems) during flight without waiting for the aircraft to land. The terms "substantially real-time" refer to the fact that there is a transmission time delay between data accumulation and subsequent data analysis performed by the off-board data analysis systems. The off-board analysis systems are improved in that the substantially real-time aircraft health data can be used in substantially real time to derive valuable information and insights into the health and safety of aircraft system without having to wait for the aircraft to land before such aircraft health data can be accessed, evaluated and acted upon. With better and more timely visibility into product performance, engineering teams can act proactively around maintenance, updates, and new product introductions.

In some embodiments of the disclosure, the efficiency of substantially real-time during-flight aircraft health data transmissions is improved by applying pre-processing operations that reduce the amount of substantially real-time during-flight aircraft health data that needs to be transmitted from the aircraft during flight. In some embodiments of the disclosure, the amount of substantially real-time during-flight aircraft health data that needs to be transmitted from the aircraft during flight is reduced by condensing or filtering out redundant or statistically irrelevant instances of the substantially real-time during-flight aircraft health data before transmission.

In embodiments of the disclosure, the novel wireless AHM system having novel IoT-based smart controllers further improves off-board analysis systems by providing the off-board analysis systems with the capability to evaluate a predictive value of the received substantially real-time aircraft health data and transmit back to the on-board portion of the novel wireless AHM system a change request associated with an aspect of how the novel wireless AHM system gathers and transmits the substantially real-time during-flight aircraft health data that is being transmitted to the off-board analysis system during flight.

In embodiments of the disclosure, the novel wireless AHM system having novel IoT-based smart controllers utilizes cognitive algorithms to perform the various data analysis and prediction operations described herein. In embodiments of the disclosure, a cognitive algorithm refers to a variety of algorithm types that generate and apply computerized models to simulate the human thought process in complex situations where the answers might be ambiguous and uncertain. A conventional cognitive algorithm includes self-learning technologies that use data mining, pattern recognition, natural language processing (NLP), and other related technologies to generate the mathematical models that make decisions (e.g., classifications, predictions, and the like) that, in effect, mimic human intelligence. In embodiments of the disclosure, the modifier "cognitive" as applied to "outputs" and/or "output actions" refers to the outputs, actions, and the like generated by cognitive algorithms to represent the result of the analysis operations performed by cognitive algorithms. A non-limiting example of a cognitive output action is predicting a range of failure dates for components of an in-service system, and a non-limiting example of a cognitive output associated with the cognitive action is an actual prediction that there is an 80% likelihood that component A of in-service system A will fail in 2-3 months from today. The cognitive output associated with the cognitive action can further include a recommendation that component A be serviced or replaced in one (1) month.

Turning now to a more detailed description of the aspects of the disclosure, FIG. 1 depicts a simplified block diagram illustrating a novel wireless aircraft health monitoring (AHM) system 100 having novel IoT-based smart controllers 140, 142, 144 embodying aspects of the disclosure. The novel wireless AHM system 100 includes an on-board aircraft information/data monitoring system 110 in communication with a ground-based flight monitoring system 170 though an off-board wireless communications path 160. In embodiments of the disclosure, the wireless communications transmitted over the off-board wireless communications path 160 are provided with security protocols to secure such wireless communications and protect them against cyber-attacks. The on-board aircraft information/data monitoring system 110 is on-board an aircraft and operable to monitor performance parameters and environmental parameters associated with a full set of monitored aircraft components/parts, which are represented in FIG. 1 as On-board System-A, On-board System-B, On-board System-C, and On-board System-D. In some embodiments of the disclosure, the IoT-based smart controllers 140, 142, 144 are IoT-enabled smart electronic power system (EPS) controllers, and On-board System-A, On-board System-B, On-board System-C, and On-board System-D are implemented as electronic power generation and distribution components/parts of an aircraft. In some embodiments of the disclosure, the electronic power generation and distribution components/parts of an aircraft include, for example, a generator control unit (GCU), a common starter motor controller (CSMC), a bus power control unit (BPCU), and the like.

Each of On-board System-A, On-board System-B, On-board System-C, and On-board System-D is electronically connected to on-board aircraft control systems 130 through a wired on-board communications network and a wireless on-board communications network. The wired on-board communications network includes a wired data-bus 120 that electronically couples each of On-board System-A, On-board System-B, On-board System-C, and On-board System-D to the on-board aircraft control systems 130. The wireless on-board communications network includes the IoT-based smart controllers 140, 142, 144 that wirelessly and electronically couple each of On-board System-A, On-board System-B, On-board System-C, and On-board System-D to the on-board aircraft control systems 130 through on-board wireless communications paths 146. In accordance with aspects of the disclosure, reliability of the on-board aircraft information/data monitoring system 110 is improved in that the wireless on-board communications network provides a communications path that is redundant to the wired on-board communications network. In accordance with aspects of the disclosure, reliability of the on-board aircraft information/data monitoring system 110 is further improved in that the wireless on-board communications network provides redundant communications paths that provide different failure points/mechanisms than the wired on-board communications network.

In accordance with embodiments of the disclosure, the wireless on-board communications network set up through the IoT-based smart controllers 140, 142, 144 and the on-board wireless communications paths 146 enable On-board System-A, On-board System-B, On-board System-C, On-board System-D, and on-board aircraft control system 130 to communicate wirelessly to an aircraft interface device 150, which implements the secured off-board wireless two-way communications path 160. Accordingly, the wireless on-board communications network enables the aircraft system health (SH) information/data to be gathered by the on-board aircraft information/data monitoring system 110, packaged into substantially real-time in-flight system health (IFSH) information 162, and transmitted off the aircraft in substantially real-time (i.e., during flight with a transmission delay) through the aircraft interface device 150 and the off-board wireless communications path 160 to the ground-based flight monitoring systems 170 for analysis. In embodiments of the disclosure, the novel IoT-based smart controllers 140, 142, 144 enable the novel wireless AHM system 100 to transmit the substantially real-time IFSH information/data 162 to the ground-based flight monitoring system 170 during flight so that aircraft health data can be accessed and analyzed during flight without waiting for the aircraft to land. The ground-based flight monitoring systems 170 are improved in that the substantially real-time aircraft health data can be used in substantially real time to derive valuable information and insights into the health and safety of On-board System-A, On-board System-B, On-board System-C, On-board System-D, and on-board aircraft control system 130 without having to wait for the aircraft to land before such aircraft health data can be accessed, evaluated and acted upon. With better and more timely visibility into product performance, engineering teams can act proactively around maintenance, updates, and new product introductions. The ground-based flight monitoring systems 170 are further improved by providing the ground-based flight monitoring systems 170 with the capability to perform a preliminary evaluation of a predictive value of the received substantially real-time IFSH information/data 162 and, in response thereto, transmit back to the on-board aircraft information/data monitoring system 110 an IFSH information query 164. In some embodiments of the disclosure, the IFSH information query 164 can be a change request, prompted by results of the preliminary evaluation of the predictive value of the received substantially real-time IFSH information/data 162, to alter and/or augment how the novel wireless AHM system 100 gathers and transmits the substantially real-time IFSH information/data 162.

Figure 6:
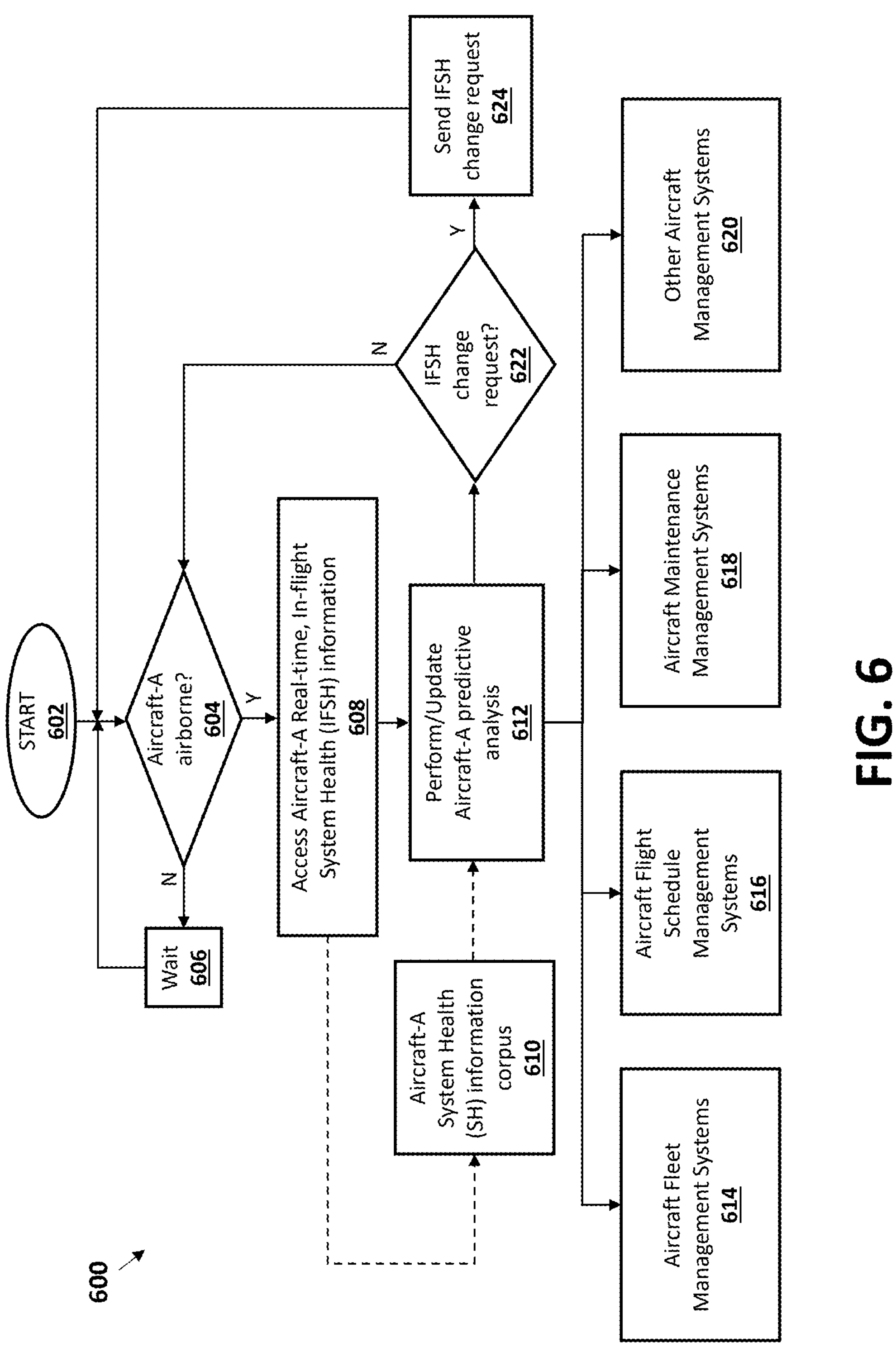
FIG. 6 is a flow diagram illustrating a methodology in accordance with embodiments of the disclosure.

Additional details of how the novel AHM system 100 operates is provided by a methodology 600, which is depicted in FIG. 6 and described in greater detail subsequently herein.

FIG. 2 is a simplified block diagram illustrating a non-limiting example of how the IoT-based smart controller 140 can be implemented as IoT-based smart controller 140A. The IoT-based smart controllers 142, 144 can also be implemented having substantially the same features and functionality as the IoT-based smart controller 140A. In general, the adjectives "smart" and/or "connected" are used herein to describe the use of computer-based, networked technologies to augment the features of a product or system. Smart/connected products (e.g., the IoT-based smart controllers 140, 142, 144) are embedded with small mobile computing processors, sensors, software and connectivity that allow data about the product to be gathered, processed and transmitted to external systems. The data collected from smart/connected products can be analyzed and used to inform decision-making and enable operational efficiencies of the product. The phrase "Internet of Things" (IoT) was coined to describe smart/connected systems of the type described above, including systems that provide some or all of their connectivity through wireless networks such as the internet.

The IoT-based smart controller 140A includes a sensor network system 210 operable to generate various SH parameters and transmit the same to a wireless controller transceiver module (WCTM) communications interface 230, configured and arranged as shown. In applications where the IoT-based smart controller 140A is in electronic communication with an On-board System (e.g., On-board System-A) that does not interface with an existing sensors network, the sensor network system 210 provides sensing capability for extracting sensed SH data from the On-bord System. Additionally, the sensor network system 210 can provide additional sensing capabilities that are not currently part of the On-board System. The sensor network system 210 (and/or the existing sensor network associated with the monitored On-board System) generates various SH parameters, non-limiting examples of which are shown in FIG. 2 as identify information/data 220, monitoring information/data 222, operational information/data 224, and system intelligence 226. The identify information/data 220 identifies the specific On-board System (e.g., On-board System-A having a specific part number) that is generating the other information/data 222, 224, 226. The monitoring information/data 222 includes environmental data such as relative temperatures, pressures, and the like associated the On-board System. The operational information/data 224 includes time-stamped data such as turn-on time, turn-off time, dwell time, and the like related to how the On-board system is being used. The system intelligence 226 is generally performing cognitive analysis (e.g., using a cognitive algorithm) to predict additional parameters that can be gathered by the sensor network system 210 and used to assess SH. The WCTM communications interface 230 is operable to convert the SH parameters 220, 222, 224, 226 to the substantially real-time IFSH information/data 162 in a format that is suitable for wireless transmission over the off-board wireless communications path 160.

Figure 3:
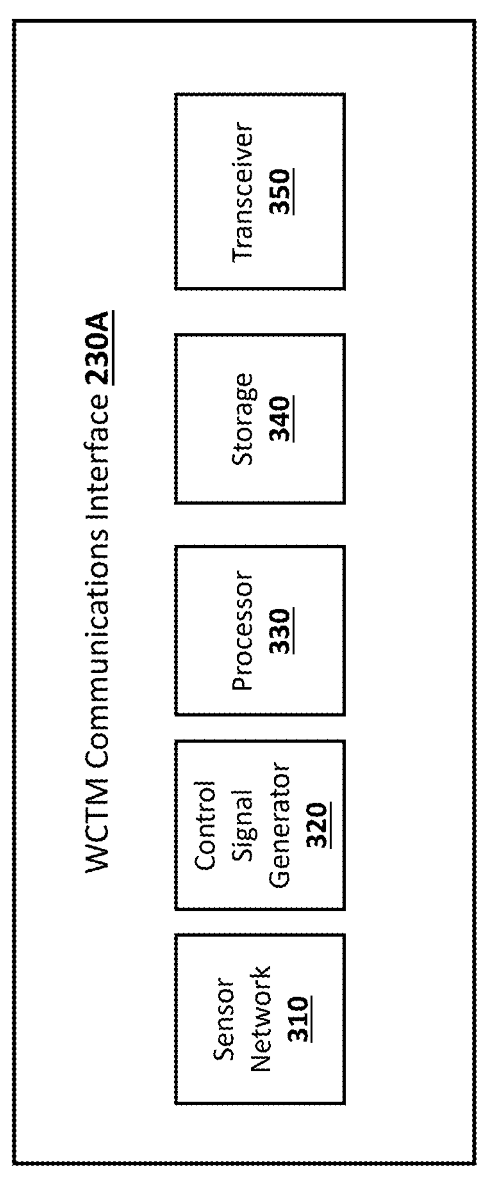
FIG. 3 is a simplified block diagram illustrating a communications interface in accordance with embodiments of the disclosure.

FIG. 3 is a simplified block diagram illustrating a non-limiting example of how the WCTM communications interface 230 can be implemented as WCTM communications interface 230A. The WCTM communications interface 230A includes a sensor network 310, a control signal generator 320, a processor 330, storage 340, and a transceiver 350, configured and arranged as shown. The sensor network 310 is operable to provide additional SH information/data based on sensed environmental and operational parameters of the relevant IoT-based smart controller itself (e.g., IoT-based smart controller 140, 140A shown in FIGS. 2 and 3). The control signal generator 320 is generally responsive to the IFSH information query 164 to generate a control signal that implements a requested change to how the substantially real-time IFSH information/data 162 is gathered. For example, and as explained in greater details subsequently herein in connection with the methodology 600 shown in FIG. 6, the IFSH information query 164 can be a request for the novel AHM 100 to perform a built-in test (e.g., a built-in self-test (BIST)) and add the result of the BIST to a subsequent transmission of the substantially real-time IFSH information data 162. The control signal generator 320 can, in response to the IFSH information query 164, generate one or more control signals that initiate the BIST and instruct the processor 330 to add results of the BIST to a subsequent transmission of the substantially real-time IFSH information data 162. The processor 330 includes a variety of applications (including cognitive algorithms) that respond to instructions and/or generate instructions that control details of how the substantially real-time IFSH information data 162 is generated and transmitted off-board, including specifically, applications necessary to perform or complete the various functions described in the methodology 600 shown in FIG. 6. In embodiments of the disclosure, the processor 330 can include all of the features and functionality of the computing system 800 (shown in FIG. 8). The storage 340 is conventional electronic storage or memory that is used by the processor 330 to carry out operations dictated by the various applications executed by the processor 330.

When functioning as receiver, the transceiver 350 receives electric signals (e.g., modulated AC). The transceiver 350 can include, for example, filters, and demodulators operable to extract the desired information from the electronic signals. The filters separate the desired frequency signal from all the other signals picked up by an antenna component of the transceiver 350; the amplifier increases the power of the signal for further processing; and the demodulator demodulates the filtered, amplified signal to recover the desired information therefrom. The recovered information produced by the transceiver 350 can be in a variety of forms. The processor 330 receives the recovered information from the transceiver 350 and further prepares it for use by the applications executed by the processor 330. The transceiver 350, the processor 330, and the storage 340 are depicted separately for ease of illustration and explanation. However, the functionality of these components can be provided in any combination.

When functioning as a transmitter, the transceiver 350 performs substantially the same receiver operation described above but in reverse, where the processor 330 modulates the desired information (e.g., received through readings from the sensor network system 210 and/or the sensor network 310) onto a signal (e.g., modulated AC) and passes the modulated signal through an antenna element of the transceiver 350. The antenna element of the transceiver converts the modulated signal to electromagnetic waves (e.g., radio waves) and transmits the same over one or more of the wireless communications paths 146.

Figure 4:
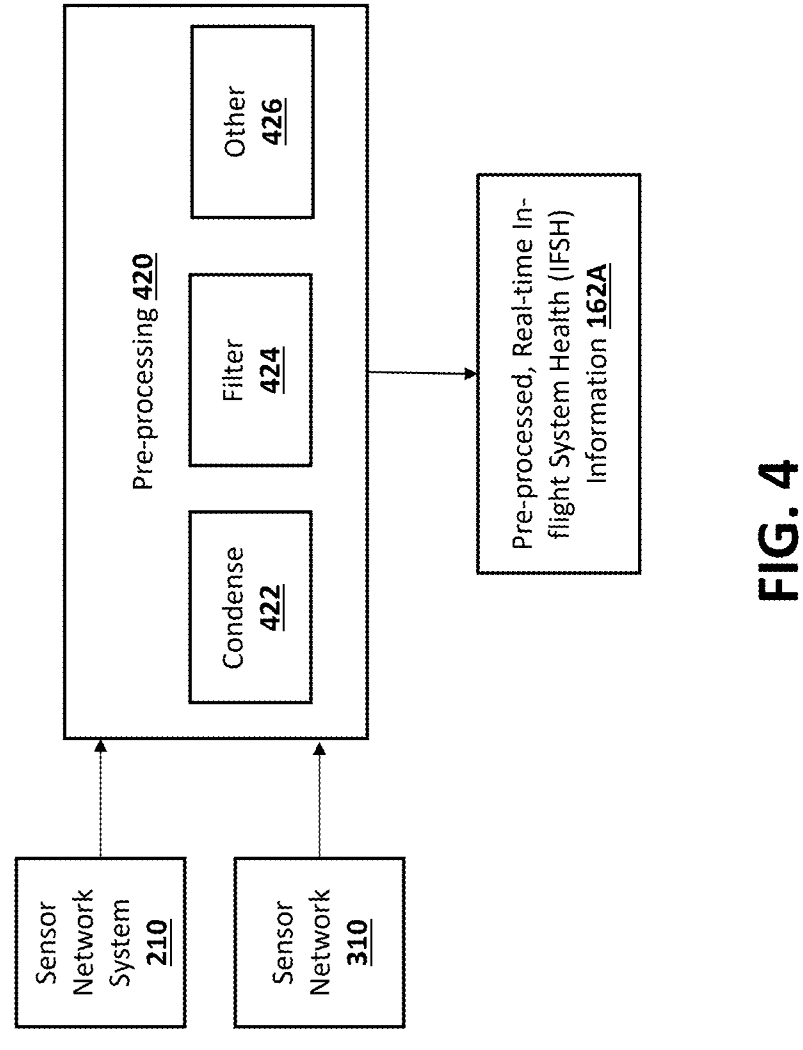
FIG. 4 is a simplified block diagram illustrating preprocessing operations in accordance with embodiments of the disclosure.

FIG. 4 is a simplified block diagram illustrating a non-limiting example of pre-processing 420 that can be one of the applications performed by the processor 330 of the WCTM communication interface 230A (shown in FIG. 3). In some embodiments of the disclosure, the efficiency of transmitting the substantially real-time IFSH information/data 162 during-flight is improved by applying the pre-processing 420 to reduce the amount of substantially real-time IFSH information/data 162 that needs to be transmitted from the aircraft during flight. In some embodiments of the disclosure, the amount of substantially real-time IFSH information/data 162 that needs to be transmitted from the aircraft during flight is reduced by condensing (condense 422) or filtering out (filter 424) redundant or statistically irrelevant instances of the substantially real-time IFSH information/data 162 before transmission, thereby creating pre-processed substantially real-time IFSH information/data 162A. In some embodiments of the disclosure, a suitable data reduction operation can be used (e.g., other 426) to implement the pre-processing 420.

Figure 5:
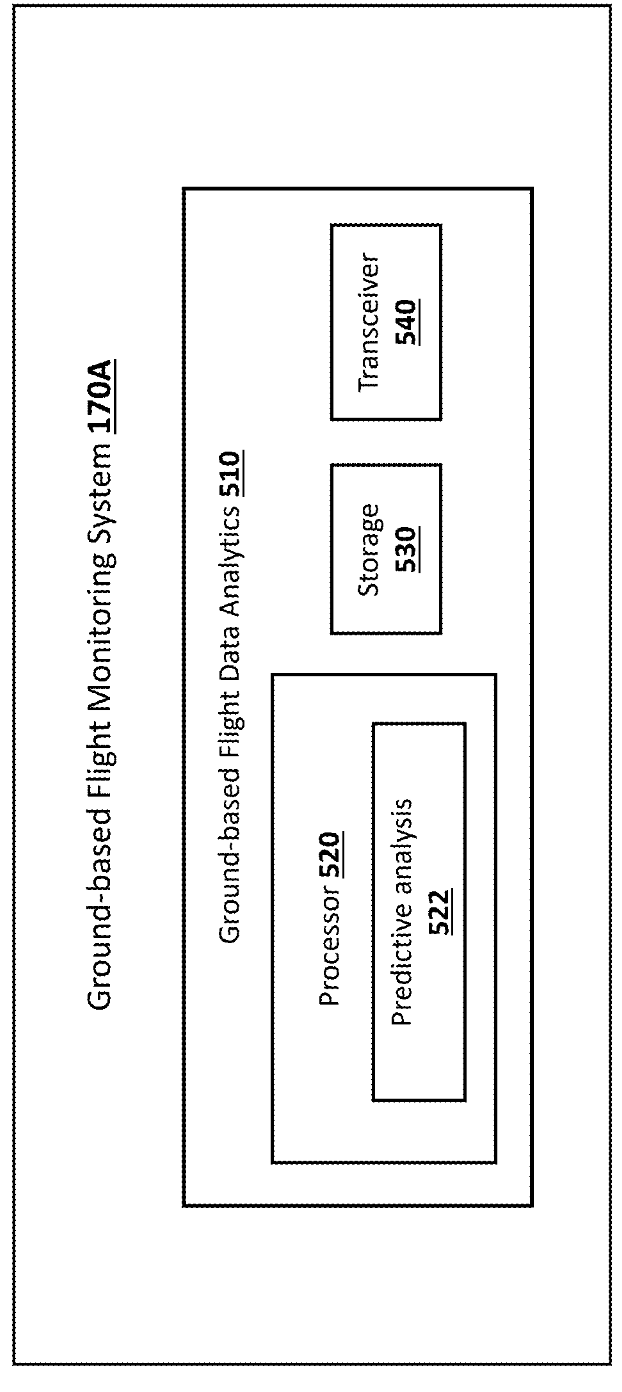
FIG. 5 is a simplified block diagram illustrating a ground-based flight monitoring system in accordance with embodiments of the disclosure.

FIG. 5 is a simplified block diagram illustrating a non-limiting example of how the ground-based flight monitoring system 170 (shown in FIG. 1) can be implemented as ground-based flight monitoring system 170A. The ground-based flight monitoring system 170A includes ground-based flight data analytics 510, a processor 520, a storage 530, and a transceiver 540, configured and arranged as shown. The processor 520, storage 530 and transceiver 540 interface with the off-board communications path 160 to perform substantially the same signal reception and signal transmission functions performed by the processor 330, storage 340, and transceiver 350 of the WCTM communications interface 230A (shown in FIG. 3). Additionally, the processor 520 include predictive analysis 522, which performs the operations at block 612 of the methodology 600 shown in FIG. 6. Details of the operations performed at block 612 of the methodology 600 are described herein in connection with the description of FIG. 6.

FIG. 6 is a flow diagram illustrating a methodology 600 in accordance with embodiments of the disclosure. In embodiments of the disclosure, the methodology 600 is implemented by the novel AHM system 100 (shown in FIG. 1), including specifically, the IoT-based smart controllers 140, 140A, 142, the aircraft interface device 150, the wireless communications path 160, and the ground-based flight monitoring system 170, 170A. In accordance with aspects of the disclosure, the on-board aircraft data/information monitoring system 110 of the system 100 is implemented on an aircraft, which is referred to in this non-limiting example as Aircraft-A. The methodology 600 starts at block 602 and moves to decision block 604 to determine whether or not Aircraft-A is airborne or in-flight. An aircraft is considered airborne when all parts of the aircraft are off the ground. In general, an aircraft includes a variety of instruments and/or systems that provide information that can be used at decision block 604 to determine whether or not Aircraft-A is airborne. For example, radar and/or laser altimeters of Aircraft-A send a radio or laser signal toward the surface and measure the time it takes for the signal to bounce back. The measured time it takes for the signal to bounce back can be used to compute an altitude of Aircraft-A, and the Altitude of Aircraft-A can be used to determine whether or not Aircraft-A is airborne. If the result of the inquiry at decision block 604 is no, the methodology 600 is not initiated and moves to block 606 to wait for a predetermined period of time. From block 606, the methodology 600 returns to the input to decision block 604 to again evaluate whether or not Aircraft-A is airborne. If the result of the inquiry at decision block 604 is yes, the methodology 600 is initiated and moves to block 608 to access Aircraft-A substantially real-time, in-flight system health (IFSH) information (or data). The "access" operations at block 608 can be implemented using, for example, the IoT-based smart controllers 140, 140A, 142, the aircraft interface device 150, the wireless communications path 160, and the ground-based flight monitoring system 170, 170A. For example, the IoT-based smart controller 140 electronically communicates with On-board System-A to gather, during flight, system-health-related performance metrics of On-board System-A, which can be used to assess the health of On-board System-A during flight. Similarly, the IoT-based smart controller 142 electronically communicates with On-board System-B to gather system-health-related performance metrics of On-board System-B, which can be used to assess the health of On-board System-B. The system-health-related performance metrics gathered by the IoT-based smart controller 140 are processed to place the system-health-related performance metrics in a format suitable for wireless transmission, thereby generating the substantially real-time IFSH information (or data) 162, which is a non-limiting example of the substantially real-time IFSH information (or data) referenced at block 608.

In some embodiments of the disclosure, an Aircraft-A system health (SH) information/data corpus is maintained in memory at one or more suitable memory systems of the system 100. The Aircraft-A SH information/data corpus can be configured and arranged to include only substantially real-time IFSH information accumulated during multiple flights of Aircraft-A. In some embodiments of the disclosure, the Aircraft-A SH information/data corpus can be configured and arranged to include substantially real-time IFSH information accumulated during multiple flights of Aircraft-A, along with Aircraft-A SH information that is not accessed and stored during flight but is instead accessed and stored while Aircraft-A is on-ground and in between flights. The methodology 600 can provide the substantially real-time IFSH information accessed at block 608 to block 610 (optionally) where the Aircraft-A SH information corpus is updated with the substantially real-time IFSH information accessed at block 608. The methodology 600 also provides the substantially real-time IFSH information accessed at block 608 to block 612 where the methodology 600 performs or updates an Aircraft-A predictive analysis. In some embodiments of the disclosure, the operations performed at block 612 can be augmented (optionally) by incorporating the Aircraft-A SH information corpus generated at block 610 into the Aircraft-A predictive analysis performed at block 612. In some embodiments of the disclosure, the operations performed at block 612 can be augmented (optionally) to incorporate only the portion of the Aircraft-A SH information corpus that includes the substantially real-time IFSH information accessed at block 608. In some embodiments of the disclosure, the operations performed at block 612 can be augmented to incorporate the portion of the Aircraft-A SH information corpus that includes the substantially real-time IFSH information accessed at block 608, along with the portion of the Aircraft-A SH information corpus that includes historical instances of the substantially real-time IFSH information gathered at block 608 during other flights of Aircraft-A. In some embodiments of the disclosure, the operations performed at block 612 can be augmented to incorporate the portion of the Aircraft-A SH information corpus that includes the substantially real-time IFSH information accessed at block 608; the portion of the Aircraft-A SH information corpus that includes historical instances of the substantially real-time IFSH information gathered at block 608 during other flights of Aircraft-A; and Aircraft-A SH information that is not accessed and stored during flight but is instead accessed and stored while Aircraft-A is on-ground and in between flights. In embodiments of the disclosure, block 612 is configured to select a first set of SH information from blocks 608, 610, perform a current iteration of the Aircraft-A predictive analysis, and evaluate a result of the current iteration of the Aircraft-A predictive analysis to determine whether or not to perform a next iteration of the Aircraft-A predictive analysis using a second set of the SH information from blocks 608, 610. For example, in some embodiments of the disclosure, the first set of the SH information from blocks 608, 610 can be only the substantially real-time IFSH information accessed at block 608, and the second set of SH information from blocks 608, 610 can be the substantially real-time IFSH information accessed at block 608 augmented with the portion of the Aircraft-A SH information corpus that includes historical instances of the substantially real-time IFSH information gathered at block 608 during other flights of Aircraft-A. All combinations of the first set of SH information from blocks 608, 610 are contemplated; and any number of current and next iterations of the Aircraft-A predictive analysis can be performed.

In some embodiments of the disclosure, the operations at block 612 can determine, based on results of current/next iterations of the Aircraft-A predictive analysis, that it would be beneficial to perform a current/next iteration of the Aircraft-A predictive analysis using Aircraft-A SH information from Aircraft-A that is not part of the SH information from blocks 608, 610. In this case, the operations at block 612 can generate an IFSH information change request. At decision block 622, the methodology 600 determines whether or not block 612 has generated an IFSH information change request. If the answer to the inquiry at decision block 622 is yes, the methodology 600 moves to block 624 and sends the IFSH information change request through the wireless communications path 160 to an appropriate system (e.g., the IoT-based smart controllers 140, 142, 144) of the Aircraft-A. From block 624, the methodology 600 moves to the input to decision block 604 to confirm that Aircraft-A is still airborne and, if Aircraft-A is still airborne, perform another iteration of blocks 608, 610, 612 where the substantially real-time IFSH information accessed at block 608 includes the IFSH information change request. The IFSH information change request can take a variety of forms. For example, the IFSH information change request can include a request to increase/decrease a sample rate of a given set of system-health-related performance metrics gathered by the IoT-based smart controller 140. As another example, the IFSH information change request can include a request to begin sampling a set of system-health-related performance metrics that is available in the system 100 but is not currently included among the system-health-related performance metrics that are gathered by the IoT-based smart controller 140. As another example, the IFSH information change request can include a request to perform a test operation (e.g., a BIST (built-in self-test)) and include results of the test operation among the system-health-related performance metrics gathered by the IoT-based smart controllers 140, 142, 144.

In accordance with embodiments of the disclosure, one or more cognitive algorithms can be trained and used to perform/update the Aircraft-A predictive analysis operations at block 612. In accordance with embodiments of the disclosure, one or more cognitive algorithms can also be trained and used to analyze results of the current/next iterations of the Aircraft-A predictive analysis to determine whether or not to augment the Aircraft-A predictive analysis through using a different combination of the SH information available from blocks 608, 610 or through generating an IFSH information change request that is processed using decision block 622, block 624, decision block 604, and block 608. For example, a first cognitive algorithm can perform a current iteration of the Aircraft-A predictive analysis that generates a prediction that a component of On-board System-A will need to be replaced between the next 10-15 hours of Aircraft-A flight time, and a second cognitive algorithm can evaluate the prediction to determine whether or not it should be augmented using the above-described augmentation methods. In accordance with embodiments of the disclosure, the second cognitive algorithm can perform multiple iterations of the above-described augmentations of the Aircraft-A predictive analysis and select one or more results of the multiple iterations of the above-described augmentations of the Aircraft-A predictive analysis for use in downstream operations of the methodology 600.

In embodiments of the disclosure, a cognitive algorithm refers to a variety of algorithm types that generate and apply computerized models to simulate the human thought process in complex situations where the answers might be ambiguous and uncertain. A conventional cognitive algorithm includes self-learning technologies that use data mining, pattern recognition, natural language processing (NLP), and other related technologies to generate the mathematical models that make decisions (e.g., classifications, predictions, and the like) that, in effect, mimic human intelligence. In embodiments of the disclosure, the modifier "cognitive" as applied to "outputs" and/or "output actions" refers to the outputs, actions, and the like generated by cognitive algorithms to represent the result of the analysis operations performed by cognitive algorithms. A non-limiting example of a cognitive output action is predicting a range of failure dates for components of an in-service system, and a non-limiting example of a cognitive output associated with the cognitive action is an actual prediction that there is an 80% likelihood that component A of in-service system A will fail in 2-3 months from today. The cognitive output associated with the cognitive action can further include a recommendation that component A be serviced or replaced in 1 month.

When the cognitive algorithms implemented at block 612 determine acceptable results of the Aircraft-A predictive analyses performed at the block 612, the results of the Aircraft-A predictive analyses performed at the block 612 are provided to one or more aircraft management systems associated with Aircraft-A, including aircraft fleet management systems 614, aircraft flight schedule management systems 616, aircraft maintenance management systems 618, and/or other aircraft management systems 620. For example, where the final Aircraft-A predictive analysis performed at block 612 generates a prediction that a component of On-board System-A will need to be replaced between the next 10-15 hours of Aircraft-A flight time, this prediction can be provided to the aircraft maintenance management systems 618 and the aircraft flight schedule management system 616, which determine that best time to replace the component of On-board System-A is after completions of Aircraft-A's next two scheduled flights, which cover six (6) total hours of flight time. Although Block 612 predicts that the component of On-board System-A will last for the next 10-15 hours of Aircraft-A flight time, after six (6) hours of flight time, Aircraft-A is schedule for a four (4) hour flight, which the systems 616, 618 determine would be too close to the lower end of the 10-15 hour component failure prediction. The aircraft fleet management system 614 uses the repair schedule set by the systems 616, 618 to determine that it must now readjust its fleet management operations to find another aircraft to take over Aircraft-A's previously scheduled four (4) hour flight.

Accordingly, it can be seen from the foregoing that embodiments of the disclosure provide technical benefits and technical effects. For example, the novel aircraft health monitoring system 100 having IoT-enabled smart controllers 140, 140A, 142 provides wireless connectivity that enable providing substantially real-time raw data during flight to other on-board and off-board applications that can use such data to derive valuable information and insights into the health and safety of aircraft system without having to wait for the aircraft to land before such raw data can be accessed, evaluated and acted upon. With better and more timely visibility into product performance, engineering teams can act proactively around maintenance, updates, and new product introductions.

A variety of computer-implemented statistical evaluation methods can be used to implement aspects of the disclosure (e.g., the various analysis operations described herein; the pre-processing module 420 shown in FIG. 4; the predictive analysis 610 shown in FIG. 6; and the like). A non-limiting example of a statistical evaluation method includes machine learning techniques, and a non-limiting example of machine learning techniques that can be used to implement aspects of the disclosure (e.g., the various cognitive algorithms described herein; the pre-processing module 420 shown in FIG. 4; the predictive analysis 610 shown in FIG. 6; and the like) will be described with reference to FIGS. 7A and 7B. Machine learning models configured and arranged according to embodiments of the disclosure will be described with reference to FIG. 7A.

Figure 7A:
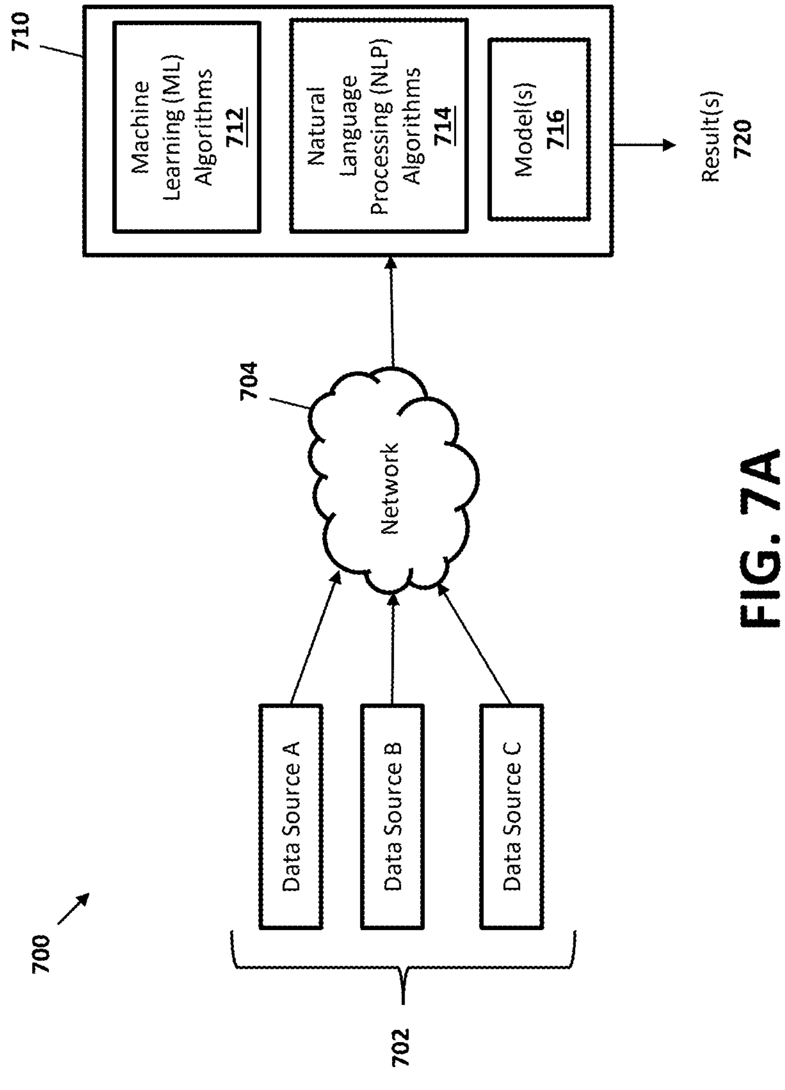
FIG. 7A depicts a machine learning system that can be utilized to implement aspects of the disclosure.

FIG. 7A depicts a block diagram showing a machine learning or classifier system 700 capable of implementing various aspects of the disclosure described herein. More specifically, the functionality of the system 700 is used in embodiments of the disclosure to generate various models and sub-models that can be used to implement computer functionality in embodiments of the disclosure. The system 700 includes multiple data sources 702 in communication through a network 704 with a classifier 710. In some aspects of the disclosure, the data sources 702 can bypass the network 704 and feed directly into the classifier 710. The data sources 702 provide data/information inputs that will be evaluated by the classifier 710 in accordance with embodiments of the disclosure. The data sources 702 also provide data/information inputs that can be used by the classifier 710 to train and/or update model(s) 716 created by the classifier 710. The data sources 702 can be implemented as a wide variety of data sources, including but not limited to, sensors configured to gather real time data, data repositories (including training data repositories), and outputs from other classifiers. The network 704 can be any type of communications network, including but not limited to local networks, wide area networks, private networks, the Internet, and the like.

Figure 8:
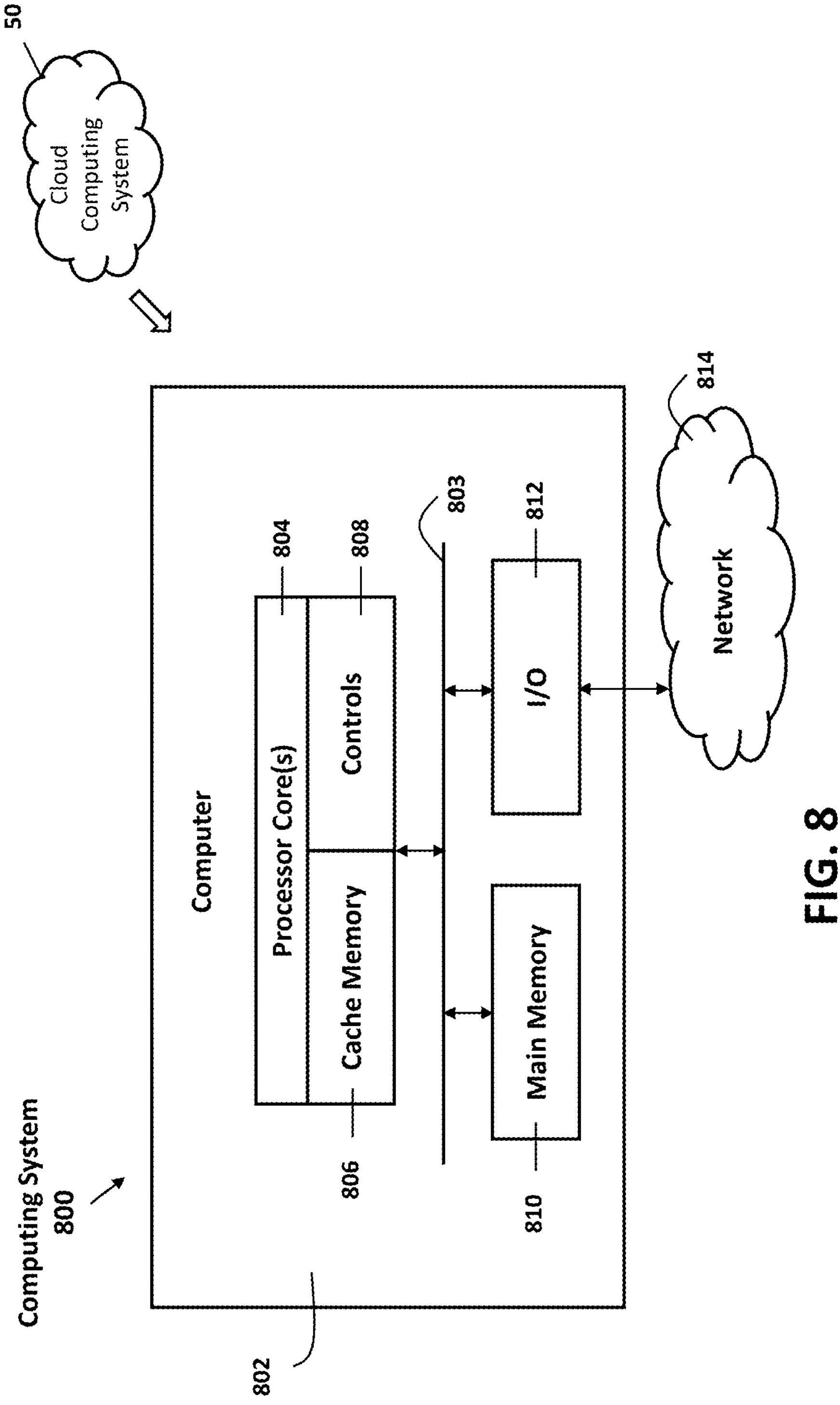
FIG. 8 depicts a computing system that can be utilized to implement aspects of the disclosure.

The classifier 710 can be implemented as algorithms executed by a programmable computer such as a computing system 800 (shown in FIG. 8). As shown in FIG. 7A, the classifier 710 includes a suite of machine learning (ML) algorithms 712; natural language processing (NLP) algorithms 714; and model(s) 716 that are relationship (or prediction) algorithms generated (or learned) by the ML algorithms 712. The algorithms 712, 714, 716 of the classifier 710 are depicted separately for ease of illustration and explanation. In embodiments of the disclosure, the functions performed by the various algorithms 712, 714, 716 of the classifier 710 can be distributed differently than shown. For example, where the classifier 710 is configured to perform an overall task having sub-tasks, the suite of ML algorithms 712 can be segmented such that a portion of the ML algorithms 712 executes each sub-task and a portion of the ML algorithms 712 executes the overall task. Additionally, in some embodiments of the disclosure, the NLP algorithms 714 can be integrated within the ML algorithms 712.

The NLP algorithms 714 include speech recognition functionality that allows the classifier 710, and more specifically the ML algorithms 712, to receive natural language data (text and audio) and apply elements of language processing, information retrieval, and machine learning to derive meaning from the natural language inputs and potentially take action based on the derived meaning. The NLP algorithms 714 used in accordance with aspects of the disclosure can also include speech synthesis functionality that allows the classifier 710 to translate the result(s) 720 into natural language (text and audio) to communicate aspects of the result(s) 720 as natural language communications.

The NLP and ML algorithms 714, 712 receive and evaluate input data (i.e., training data and data-under-analysis) from the data sources 702. The ML algorithms 712 includes functionality that is necessary to interpret and utilize the input data's format. For example, where the data sources 702 include image data, the ML algorithms 712 can include visual recognition software configured to interpret image data. The ML algorithms 712 apply machine learning techniques to received training data (e.g., data received from one or more of the data sources 702) in order to, over time, create/train/update one or more models 716 that model the overall task and the sub-tasks that the classifier 710 is designed to complete.

Figure 7B:
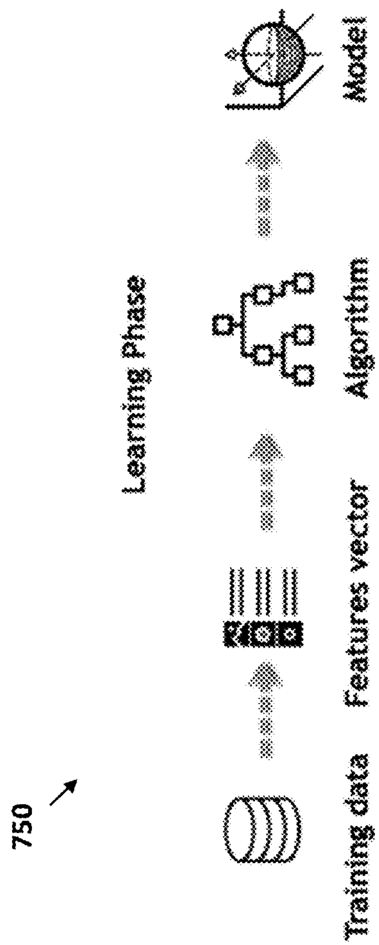
FIG. 7B depicts a learning phase that can be implemented by the machine learning system shown in FIG. 7A.

Referring now to FIGS. 7A and 7B collectively, FIG. 7B depicts an example of a learning phase 750 performed by the ML algorithms 712 to generate the above-described models 716. In the learning phase 750, the classifier 710 extracts features from the training data and coverts the features to vector representations that can be recognized and analyzed by the ML algorithms 712. The features vectors are analyzed by the ML algorithm 712 to "classify" the training data against the target model (or the model's task) and uncover relationships between and among the classified training data. Examples of suitable implementations of the ML algorithms 712 include but are not limited to neural networks, support vector machines (SVMs), logistic regression, decision trees, hidden Markov Models (HMMs), etc. The learning or training performed by the ML algorithms 712 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 710 and the ML algorithms 712. Unsupervised learning can utilize additional learning/training methods including, for example, clustering, anomaly detection, neural networks, deep learning, and the like.

When the models 716 are sufficiently trained by the ML algorithms 712, the data sources 702 that generate "real world" data are accessed, and the "real world" data is applied to the models 716 to generate usable versions of the results 720. In some embodiments of the disclosure, the results 720 can be fed back to the classifier 710 and used by the ML algorithms 712 as additional training data for updating and/or refining the models 716.

In aspects of the disclosure, the ML algorithms 712 and the models 716 can be configured to apply confidence levels (CLs) to various ones of their results/determinations (including the results 720) in order to improve the overall accuracy of the particular result/determination. When the ML algorithms 712 and/or the models 716 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the disclosure, the classifier 710 can be configured to apply confidence levels (CLs) to the results 720. When the classifier 710 determines that a CL in the results 720 is below a predetermined threshold (TH) (i.e., CL<TH), the results 720 can be classified as sufficiently low to justify a classification of "no confidence" in the results 720. If CL>TH, the results 720 can be classified as sufficiently high to justify a determination that the results 720 are valid. Many different predetermined TH levels can be provided such that the results 720 with CL>TH can be ranked from the highest CL>TH to the lowest CL>TH.

FIG. 8 illustrates an example of a computer system 800 that can be used to implement the various processor-related operations and/or cognitive algorithms described herein. The computer system 800 includes an exemplary computing device ("computer") 802 configured for performing various aspects of the content-based semantic monitoring operations described herein in accordance embodiments of the disclosure. In addition to computer 802, exemplary computer system 800 includes network 814, which connects computer 802 to additional systems (not depicted) and can include one or more wide area networks (WANs) and/or local area networks (LANs) such as the Internet, intranet(s), and/or wireless communication network(s). Computer 802 and additional system are in communication via network 814, e.g., to communicate data between them.

Exemplary computer 802 includes processor cores 804, main memory ("memory") 810, and input/output component(s) 812, which are in communication via bus 803. Processor cores 804 includes cache memory ("cache") 806 and controls 808, which include branch prediction structures and associated search, hit, detect and update logic, which will be described in more detail below. Cache 806 can include multiple cache levels (not depicted) that are on or off-chip from processor 804. Memory 810 can include various data stored therein, e.g., instructions, software, routines, etc., which, e.g., can be transferred to/from cache 806 by controls 808 for execution by processor 804. Input/output component(s) 812 can include one or more components that facilitate local and/or remote input/output operations to/from computer 802, such as a display, keyboard, modem, network adapter, etc. (not depicted).

A cloud computing system 50 is in wired or wireless electronic communication with the computer system 800. The cloud computing system 50 can supplement, support or replace some or all of the functionality (in any combination) of the computing system 800. Additionally, some or all of the functionality of the computer system 800 can be implemented as a node of the cloud computing system 50.

For the sake of brevity, conventional techniques related to making and using the disclosed embodiments may or may not be described in detail herein. In particular, various aspects of computing systems and specific computer programs to implement the various technical features described herein are well known. Accordingly, in the interest of brevity, many conventional implementation details are only mentioned briefly or are omitted entirely without providing the well-known system and/or process details.

For convenience, some of the technical operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the formal and technical description represented by the informal expression.

Many of the functional units of the systems described in this specification have been labeled as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

The various components/modules/models of the systems illustrated herein are depicted separately for ease of illustration and explanation. In embodiments of the disclosure, the functions performed by the various components/modules/models can be distributed differently than shown without departing from the scope of the various embodiments of the disclosure describe herein unless it is specifically stated otherwise.

Aspects of the disclosure can be embodied as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The terms "about," "substantially," "substantial," "approximately," and equivalents thereof are intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft health monitoring system comprising an in-flight controller, wherein the in-flight controller is configured to:

responsive to a determination that an aircraft is in-flight, access a sensor network system of the aircraft to generate in-flight system health (IFSH) information; and initiate a transmission operation that transmits the IFSH information through a wireless communications path to a ground-based flight monitoring system;

wherein the ground-based flight monitoring system is operable to, responsive to the IFSH information, initiate an aircraft management operation associated with the aircraft, the aircraft management operations comprising analyzing, evaluating and acting on the IFSH while the aircraft is in-flight without waiting for the aircraft to land.

2. The aircraft health monitoring system of claim 1, wherein the controller is further configured to receive through the wireless communications path an IFSH change request.

3. The aircraft health monitoring system of claim 2, wherein the controller is further configured to, responsive to the IFSH change request, change an aspect of the IFSH information that is transmitted through the wireless communications path to the ground-based flight monitoring system.

4. The aircraft health monitoring system of claim 3, wherein the change to the aspect of the IFSH information comprises including an additional set of IFSH information with the IFSH information.

5. The aircraft health monitoring system of claim 3, wherein the change to the aspect of the IFSH information comprises changing an information sampling rate associated with generating the IFSH information.

6. The aircraft health monitoring system of claim 1, wherein the IFSH information comprises pre-processed IFSH information.

7. The aircraft health monitoring system of claim 6, wherein the controller is further configured to apply preprocessing operations to at least a portion of the IFSH information to generate the pre-processed IFSH information.

8. The aircraft health monitoring system of claim 7, wherein the pre-processing operations are selected from a group consisting of:

condensing the portion of the IFSH information; and filtering the portion of the IFSH information.

9. The aircraft health monitoring system of claim 1, wherein the aircraft management operation comprises using IFSH information in a predictive analysis operation.

10. The aircraft health monitoring system of claim 9, wherein a result of the predictive analysis operation is provided to a flight management system associated with the aircraft.

11. A method of making an in-flight controller of an aircraft health management system, the method comprising:

configuring the in-flight controller to:

responsive to a determination that an aircraft is in-flight, access a sensor network system of the aircraft to generate in-flight system health (IFSH) information; and initiate a transmission operation that transmits the IFSH information through a wireless communications path to a ground-based flight monitoring system;

wherein the ground-based flight monitoring system is operable to, responsive to the IFSH information, initiate an aircraft management operation associated with the aircraft, the aircraft management operations comprising analyzing, evaluating and acting on the IFSH while the aircraft is in-flight without waiting for the aircraft to land.

12. The method of claim 11, wherein the controller is further configured to receive through the wireless communications path an IFSH change request.

13. The method of claim 12, wherein the controller is further configured to, responsive to the IFSH change request, change an aspect of the IFSH information that is transmitted through the wireless communications path to the ground-based flight monitoring system.

14. The method of claim 3, wherein the change to the aspect of the IFSH information comprises including an additional set of IFSH information with the IFSH information.

15. The method of claim 13, wherein the change to the aspect of the IFSH information comprises changing an information sampling rate associated with generating the IFSH information.

16. The method of claim 11, wherein the IFSH information comprises pre-processed IFSH information.

17. The method of claim 16, wherein the controller is further configured to apply preprocessing operations to at least a portion of the IFSH information to generate the pre-processed IFSH information.

18. The method of claim 17, wherein the pre-processing operations are selected from a group consisting of:

condensing the portion of the IFSH information; and filtering the portion of the IFSH information.

19. The method of claim 11, wherein the aircraft management operation comprises using IFSH information in a predictive analysis operation.

20. The method of claim 19, wherein a result of the predictive analysis operation is provided to a flight management system associated with the aircraft.

* * * * *